(12) United States Patent
Wezelenburg et al.

(10) Patent No.: US 7,743,366 B2
(45) Date of Patent: Jun. 22, 2010

(54) SYSTEM AND METHOD FOR COMPILING A COMPUTER PROGRAM

(75) Inventors: Martinus Cornelis Wezelenburg, Leuven (BE); Koenraad Pieter Lodewijk Van Nieuwenhove, Asse (BE)

(73) Assignee: ARM Limited, Cambridge (GB)

( * ) Notice: Subject to any disclaimer, the term of this patent is extended or adjusted under 35 U.S.C. 154(b) by 1297 days.

(21) Appl. No.: 11/240,798

(22) Filed: Oct. 3, 2005

(65) Prior Publication Data
US 2007/0079297 A1 Apr. 5, 2007

(51) Int. Cl.
G06F 9/44 (2006.01)
(52) U.S. Cl. ..................................................... 717/131
(58) Field of Classification Search ......... 717/157–160, 717/120, 128, 130, 131
See application file for complete search history.

(56) References Cited

U.S. PATENT DOCUMENTS

| | | | | |
|---|---|---|---|---|
| 6,023,583 A * | 2/2000 | Honda | ......................... | 717/158 |
| 6,092,180 A * | 7/2000 | Anderson et al. | ........... | 712/200 |
| 6,668,312 B2 * | 12/2003 | Aubury | ....................... | 711/170 |
| 6,961,925 B2 * | 11/2005 | Callahan et al. | ............. | 717/128 |
| 7,367,024 B2 * | 4/2008 | Barua et al. | .................. | 717/157 |
| 2004/0163075 A1 * | 8/2004 | Beltmann | .................... | 717/120 |

* cited by examiner

*Primary Examiner*—Tuan Anh Vu
(74) *Attorney, Agent, or Firm*—Nixon & Vanderhye P.C.

(57) ABSTRACT

A system and method for compiling a computer program comprising (a) performing a compilation generating an initial mapping of each code portion of the program in the memory; b) evaluating and generating a cost value associated with the initial mapping; c) if the cost value does not satisfy a threshold cost value, re-performing the compilation having regard to the record of each memory section; d) re-evaluating and generating a revised cost value associated with the modified mapping; e) iteratively repeating steps (c) and (d) until a predetermined condition is met; and f) outputting the mapping whose associated cost value most closely satisfied the threshold cost value. Such an approach enables a reduction in the power consumption resulting from memory accesses, reduces local memory requirements, and reduces the risk that size and complexity of the computer program will be constrained by the given local program memory size.

19 Claims, 6 Drawing Sheets

SYSTEM AND METHOD FOR COMPILING A COMPUTER PROGRAM

BACKGROUND OF THE INVENTION

1. Field of the Invention

The present invention relates to a system and method for compiling a computer program in order to determine where to store the computer program in memory for subsequent retrieval by a data processing apparatus that is to execute the computer program.

2. Description of the Prior Art

When designing a processing unit such as a central processing unit (CPU) or a Digital Signal Processor (DSP), there are a number of factors which are important in determining the success of that processing unit. Firstly, it is desirable to minimise the cost of the processing unit, and significant factors in this are the cost of local program memory, which is primarily dictated by the size of such local program memory, as well as the energy consumption associated with access to the memory. However, when considering such cost factors, another factor that has to be borne in mind is the risk that the size and complexity of an application written to run on such a processing unit becomes strongly constrained by the selected local program memory size. Hence, whilst reducing the size of the local program memory will reduce the cost of the processing unit, this has to be weighed against the need to reduce the above risk.

Nowadays, a number of DSP designs are being targeted at high throughput computation, and for such implementations the presence of local high speed, high availability, memory is often a requirement.

There are a number of known approaches which aim to reduce the cost of the processing unit by enabling a reduction in local program memory size and a reduction in energy consumption associated with access to memory. A first approach employs linker based modular programming to enable dynamic, and either automatic or manual, management of functional objects such as the program, static (shared) data space and state data space. Another approach involves the use of automatic, instruction level, virtualisation of the memory space through the use of caches or paging mechanisms.

Both of the above approaches can provide powerful techniques for reducing the earlier-mentioned costs, but they also incur their own costs. For example, a cache is purely reactive unless some assumptions about the data being cached are made (e.g. the processing unit needs the first line of data and hence probably also requires the second). In addition, caches are costly to implement, since each cache line or block requires a tag structure to be provided to manage access to the cache. With regard to the earlier described modular programming approach, this requires the partitioning of code into modules, with the modules then being fetched from memory as needed. Such partitioning of the code is performed based on the organisation of the code in the source language, and on tool behaviour in the example of a linkage based model, but not on the actual code's behaviour, and accordingly it should be noted that the partitioning is performed based on incomplete information. Given this incomplete information, it is typically the case that such modular programming will not minimise the cost figures discussed earlier, namely minimal local memory requirement and minimal power consumption. Furthermore, it should be noted that the partitioning required will be implementation specific.

It should be noted that although the modular programming approach or the cache/paging mechanism approach discussed earlier are effective at reducing the risk of "insufficient memory", they do so with an additional cost. In a modular system, the module sizes and their required swapping result in memory fragmentation. In a cached system, since all access is performed through the cache, the cache is in fact the earlier mentioned high-speed and high availability memory in question but due to its complexity and tight coupling with the CPU, the attainable CPU speed depends on the cache size, effectively limiting this size.

Accordingly, it would be desirable to provide an improved technique for reducing the earlier-mentioned cost issues associated with the processing unit, whilst also reducing the risk that the total size and complexity of an application written to run on that processing unit is unduly constrained by the local program memory size associated with the processing unit, without having to resort to traditional caching and/or modularization techniques.

SUMMARY OF THE INVENTION

Viewed from a first aspect, the present invention provides a method of compiling a computer program for execution on a data processing apparatus having memory comprising a plurality of memory sections, each memory section having a record associated therewith identifying one or more access properties associated with that memory section, the method comprising the steps of: a) performing a compilation in order to generate an initial mapping of each code portion of the program in the memory; b) evaluating a cost function to generate a cost value associated with the initial mapping; c) if the cost value does not satisfy a threshold cost value, re-performing the compilation having regard to the record of each memory section in order to generate a modified mapping; d) re-evaluating the cost function to generate a revised cost value associated with the modified mapping; e) iteratively repeating steps (c) and (d) until a predetermined condition is met; and f) outputting the mapping whose associated cost value most closely satisfied the threshold cost value.

In accordance with the present invention, a technique is incorporated within the process of compiling a computer program for execution on a processing unit of a data processing apparatus with the aim of alleviating the above-mentioned problems. In particular, an original compilation of the computer program will generate an initial mapping of each code portion of the program in the memory. In one embodiment, such an initial mapping will assume a non-constrained, flat, memory model, i.e. where all memory sections of the memory are assumed to have the same costs associated therewith, for example in terms of power consumption, latency, access bandwidth, etc.

Then a cost function is evaluated in order to determine a cost value associated with the initial mapping. Given the initial mapping, it will be known which code portions are intended to be mapped to which memory sections, and in evaluating the cost function a number of factors associated with memory accesses to particular memory sections will be derived from the access properties identified in the corresponding memory records.

A threshold cost value is provided (typically this being provided by the person responsible for managing the compilation of the computer program for the target processing unit), and if the cost value generated as a result of evaluating the cost function does not satisfy the threshold cost value, then the compilation is re-performed having regard to the record of each memory section in order to generate a modified mapping. Thereafter, the cost function is re-evaluated to generate a revised cost value associated with the modified mapping.

The steps of re-performing the compilation and re-evaluating the cost function are repeated iteratively until a predetermined condition is met, and once that condition is met, the mapping whose associated cost value most closely satisfied the threshold cost value is output.

By such an approach, during the compiling of the computer program, individual code portions can be relocated based on static program analysis, which can provide particularly beneficial results for local memory constrained processing units. Since individual code portions can be relocated with the aim of achieving a desired threshold cost value, this can for example allow the compilation process to produce a memory mapped program where often used code is mapped in local memory, thus reducing power consumption and stall probability, whilst infrequently used code is mapped in external memory, thus reducing the local memory requirement. When the compilation process achieves such a goal, this can result in an outcome where even if the computer program code does not fit in local program memory, that code can be executed with almost no cycle penalty even when there is minimal external program memory bandwidth available for accessing external memory, and hence such external accesses incur high latency. As another example, code portions which are purely sequential can be safely mapped on high latency, but sufficient throughput, buffered memory, while code with a lot of branches, although not often used, can be kept in local memory to avoid the latency of the buffered memory. The above two examples are merely illustrative but serve to illustrate the flexibility of the approach of the present invention, Furthermore, the fact that any code portion can be mapped to external memory in accordance with the above-described relocation technique also addresses the earlier-mentioned risk reduction issue, since there is no constraint on the total application size, and hence the size and complexity of the application will not be unduly constrained by a chosen local program memory size.

The memory sections of the memory may take a variety of forms. For example, in one embodiment, each memory section may be a physically separate piece of memory, for example off-chip memory, on-chip memory, a Tightly Coupled Memory (TCM) dedicated to the processing unit, etc. However, there is no requirement that each memory section has to correspond to a physically separate piece of memory, and in some embodiments at least some of the separate memory sections will actually reside within the same physical memory. In particular, it is possible that a part of a physical memory may have different access properties to another part, and in such embodiments, these different parts can each be considered to be a separate memory section, and can be provided with their own associated record identifying one or more access properties associated with the memory section.

The above-described steps of the method of the present invention can be implemented in a variety of ways. For example, in one embodiment, at least said steps (b) to (d) are performed by a driver tool which receives at least the cost function and the record of each memory section as inputs and produces the modified mapping as an output. In such embodiments, the driver tool can be considered to comprise a joint minimiser function and compiler, the minimiser function seeking to minimise the cost function. The minimiser function can be implemented using any one of a number of known minimisation procedures that can seek to minimise an arbitrary target function, in this case the cost function. In one embodiment, the minimiser may be implemented as an optimiser for discrete and/or non-linear problems.

In an alternative embodiment, the minimising function is provided separately to the compiler, the compiler being arranged to perform a compilation of the computer program based on a set of operating constraints of the compiler. In such embodiments, the compilation at said steps (a) and (c) is performed by the compiler, and said step (c) comprises the steps of: modifying the set of operating constraints having regard to the record of each memory section; and re-performing the compilation in the compiler based on the modified set of operating constraints in order to generate the modified mapping. In such embodiments, a minimiser function is provided which again seeks to minimise the cost function, but in doing so produces as a output a modified set of operating constraints for the compiler, rather than directly outputting a modified mapping. The compiler then uses the modified operating constraints to generate a modified mapping. Again, the minimiser function can be any one of a number of known minimisation procedures aimed at minimising a chosen target function.

In one embodiment, the method further comprises the step of: providing at least one user defined constraint identifying a desired limitation to be taken into account when mapping each code portion of the program in the memory. In accordance with such embodiments, a user, for example the person responsible for compiling the computer program, can identify certain desired limitations. However, these limitations are not strict conditions to be adhered to at all costs, since this could potentially lead to situations where the compilation method is unable to produce a mapping for the code portions which enables the threshold cost value to be met, due to the selection of an unrealistic limitation by the user. Hence, in accordance with one such embodiment, instead of being restricted to abide by the desired limitation, the method further comprises the step of, if during said step (e) a lack of convergence of the cost value with the threshold cost value is detected, then modifying the user defined constraint when generating the modified mapping at said step (c).

The detection of a lack of convergence can be made in a variety of ways. However, in one embodiment, the lack of convergence is detected if at least one of the following conditions is detected: the decrease of the cost value exceeds a predetermined maximum rate of decay; the decrease of the cost value is lower than a predetermined minimum rate of decay; the cost value increases.

By such an approach, the compilation method of embodiments of the present invention can loosen the user defined constraint, if this results in an appropriate decline in the cost value, and hence causes the process to proceed towards convergence of the cost value with the threshold cost value Further, in some instances, the compilation method can tighten the user defined constraint if the desired limitation identified by that constraint is considered unnecessary, since again this can assist in causing the process to proceed towards convergence of the cost value with the threshold cost value. Such tightening of the user defined constraint can be particularly beneficial when multiple independent programs are being subject to the compilation process. By way of example, if the user defined constraint had identified that X bytes of local memory may be allocated to a particular program, but the compilation process determines that the desired cost value can be achieved with a local memory usage of less than X bytes, then that saving in local memory usage is available for use by other programs being compiled.

The processing unit for which the computer program is intended for execution can take a variety of forms. However, in one embodiment, the computer program is for execution on a data engine operable to perform tasks on behalf of a main processing unit of the data processing apparatus. It is often the case that such data engines will be local memory constrained, due to the need to keep the cost of the data engine down, and accordingly the techniques of embodiments of the present invention are particularly beneficial when applied to the compilation of computer programs for execution on such a data engine.

In one embodiment, the data engine comprises a data engine core operable to execute the computer program and a data engine subsystem operable to manage access to said memory sections by the data engine core, and at said step (c) the re-performing of the compilation further has regard to a subsystem record identifying one or more aspects of the data engine subsystem that alters the data engine core's perception of at least one access property associated with at least one of said memory sections. Hence, by such an approach, features of the data engine subsystem that may amortise the cost related access properties identified in one or more of the memory section records can be taken into account when generating a modified mapping. As an example, if one of the memory sections is an SDRAM memory, and the subsystem provides an interface to that SDRAM that includes a buffer, then this may reduce the average latency of the SDRAM from the data engine core's perspective.

The predetermined condition which, if met, causes the iterative repetition of steps (c) and (d) can take a variety of forms. In one embodiment, the predetermined condition is met if at least one of the following events occurs: the revised cost value satisfies the threshold cost value; a predetermined period of time has elapsed without the revised cost value satisfying the threshold cost value; the rate of change of the cost value drops below a predetermined level. Such an embodiment provides an effective balance between allowing the iterative repetition of steps (c) and (d) to continue in the hope of meeting the threshold cost value, and bringing the process to a conclusion when it appears that the meeting of such a threshold cost value will not be met.

The size of the individual code portions that can be relocated amongst the various memory sections using the techniques of embodiments of the present invention can vary. However, in one embodiment, at least one code portion is an individual instruction. Hence, in such embodiments, the technique allows instruction level relocation of object code based on static program analysis. As well as relocating code portions consisting of individual instructions, the technique of embodiments of the present invention can also be used to relocate a code portion consisting of a particular loop of instructions, which can be particularly beneficial, especially when such an instruction loop is executed frequently.

In one embodiment, the re-evaluation of the cost function at said step (d) comprises the steps of: deriving from the modified mapping access information comprising at least one of the frequency of access to each memory section and access patterns of the program being compiled; and using the access properties identified in the record of each memory section and the access information to evaluate the cost function. Hence, the frequency of access to each memory section, and/or the access patterns of the computer program code can be determined from the modified mapping, and then the memory section records used to evaluate an associated cost.

In one embodiment, when evaluating the cost function one or more of the following factors associated with a memory access is derived from the access properties identified in the associated record: power consumption associated with the memory that is the subject of the memory access; latency of the memory that is the subject of the memory access; bandwidth associated with the memory that is the subject of the memory access; cost of the memory that is the subject of the memory access; potential impact on other elements of the data processing apparatus with which the memory that is the subject of the memory access is shared.

With regard to the memory latency factor, this can be expressed in a variety of ways. In one embodiment, it takes into account burst access properties, since typically for a burst access, the latency of the first access is relatively high, but subsequent data accesses in the burst may have low latency, for example it may be possible to access data each cycle after the initial access in the burst.

With regard to the last factor mentioned, this enables some consideration to be given to the potential performance impact that a particular access may cause with respect to other elements of the data processing apparatus not involved in that particular memory access. As an example, if a data engine shares a particular memory section with another element of the data processing apparatus, for example another data engine or a main central processing unit, then whilst that memory section is handling an access instigated by the data engine, it cannot at the same time handle an access instigated by any of the other elements sharing access to that memory section, which may cause those other elements to stall. In accordance with the above embodiment, such factors can be taken into account when evaluating the cost function for a particular mapping.

A compiler used to perform the compilation at steps (a) and (c) may take a variety of forms. However, in one embodiment, the compiler receives source code of the computer program and produces corresponding object code, and is operable to produce from the source code an intermediate representation of the computer program maintaining total information about the computer program being compiled. One particular example of such a compiler is a data flow graph compiler, where the intermediate representation of the computer program takes the form of a data flow graph in which vertices represent data processing operations performed by the computer program and links between the vertices represent data flow between data processing operations. Such an intermediate representation maintains total information about the computer program being compiled, and this hence enables the modified mappings to be generated based on an analysis of the behaviour of the total computer program with respect to program memory access at the individual code portion level, as both local and global data dependencies are known. Such compilers should be contrasted with compilers of the type that convert the source code into object code by in effect using a scanning window to view a portion of the source code at any particular point in time, such that at any point in time the compiler only has partial information about the computer program being compiled.

Viewed from a second aspect, the present invention provides a computer program product comprising a computer program carrier bearing a computer program operable to control a computer to perform a method in accordance with the first aspect of the present invention. Hence, such a computer program product may contain both the minimiser software and the compiler software (whether they are packaged as an all-in-one tool or separately) to enable the method of embodiments of the present invention to be executed on a computer in order to compile a computer program intended for execution on a processing unit of a data processing apparatus.

In accordance with a third aspect, the present invention provides a system for compiling a computer program for execution on a data processing apparatus having memory comprising a plurality of memory sections, each memory section having a record associated therewith identifying one or more access properties associated with that memory section, the system comprising: compiler logic operable to performing a compilation in order to generate an initial mapping of each code portion of the program in the memory; cost function logic operable to evaluate a cost function to generate a cost value associated with the initial mapping; the compiler logic being operable, if the cost value does not satisfy a threshold cost value, to re-perform the compilation having regard to the record of each memory section in order to generate a modified mapping; the cost function logic being operable to re-evaluate the cost function to generate a revised cost value associated with the modified mapping; the compiler logic and cost function logic being operable to iteratively repeat the re-performing of the compilation and the re-evaluating of the cost function until a predetermined condition is met; wherein once the predetermined condition is met the mapping whose associated cost value most closely satisfied the threshold cost value is output.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
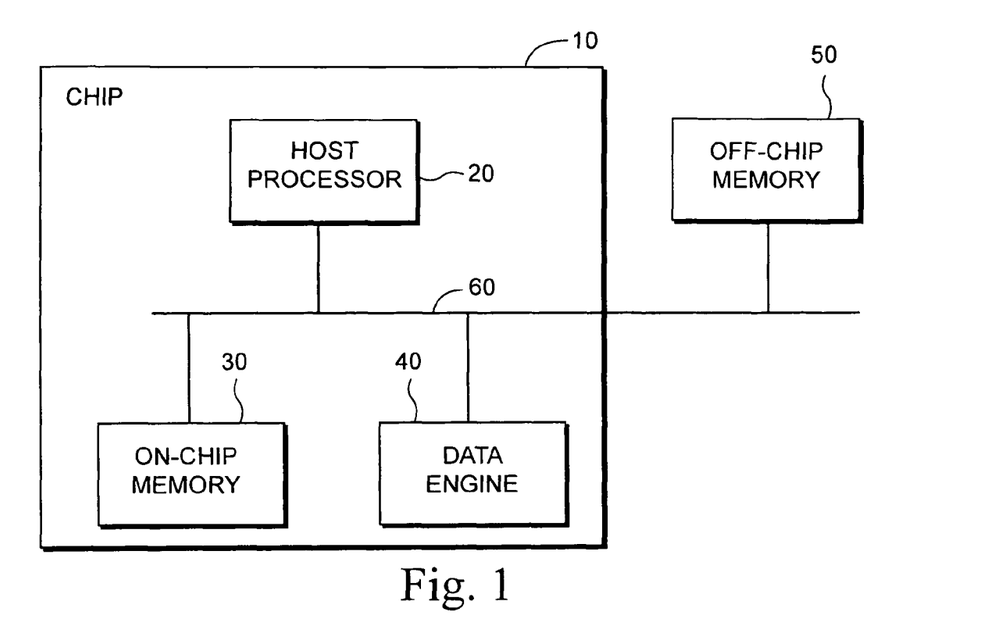
FIG. 1 is a block diagram of a data processing apparatus on which a computer program compiled in accordance with one embodiment of the present invention may be executed.

FIG. 1 is a block diagram of a data processing apparatus on which a computer program compiled in accordance with techniques of embodiments of the present invention may be executed. The data processing apparatus has a host processor 20 which can communicate via a host bus 60 (which may in fact constitute a network of separate buses) with a variety of other devices connected to the host bus. In particular, a data engine 40 may be provided for performing certain tasks on behalf of the host processor 20. A number of memory devices 30, 50 may also be coupled to the host bus 60 for storing data required by the host processor 20 and/or the data engine 40. In one embodiment, either or both of the memory devices 30, 50 are shared between the host processor 20 and the data engine 40. In one embodiment, the host processor 20 is arranged to allocate any appropriate memory regions of the memory devices 30, 50 to the data engine 40 for use by that data engine when performing tasks on behalf of the host processor 20.

In one particular embodiment, the host processor 20, data engine 40 and memory device 30 are provided on a chip 10, and hence the memory device 30 is referred to herein as on-chip memory. In this embodiment, the memory device 50 is off-chip memory accessible by the host processor 20, and if required the data engine 40, using the network of buses 60. The off-chip memory 50 may in one embodiment comprise an SDRAM, which will typically provide a large area of memory for storing data, but memory accesses to such off-chip memory will typically consume relatively high power, and have a relatively high latency. In contrast, the on-chip memory 30 will typically be a smaller memory device, for example an SRAM, which will provide a lower latency for accesses, and typically a reduced power consumption, when compared with the off-chip memory 50.

Figure 2:
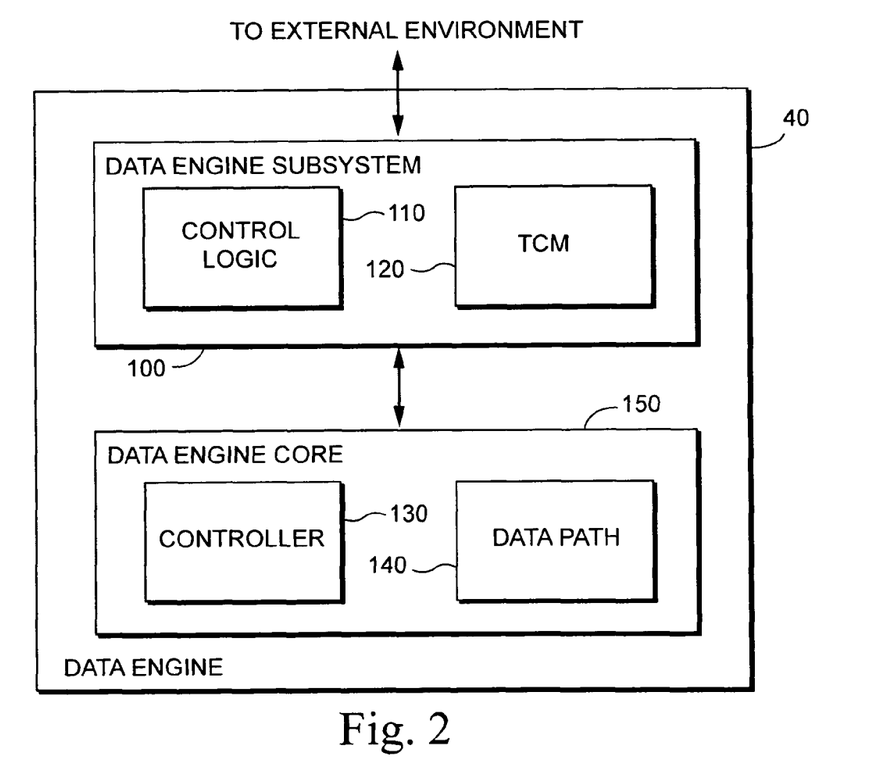
FIG. 2 is a block diagram illustrating in more detail the data engine of FIG. 1.

FIG. 2 is a block diagram illustrating in more detail the logic provided within the data engine 40 in accordance with one embodiment of the present invention. The data engine 40 has a data engine core 150 for performing data processing tasks on behalf of the host processor 20, and a data engine subsystem 100 configurable by the main processing unit 20 and arranged to manage communication between the data engine core 150 and an allocated resource, for example the on-chip memory 30 or the off-chip memory 50. Typically such resources are allocated to the data engine 40 by the host processor 20 to enable the data engine 40 to perform the required tasks. An application being run on the data processing apparatus will typically consist of a number of separate sessions, and for each session the host processor 20 will typically be arranged to configure the data engine subsystem 100 and to allocate appropriate memory resources for use by the data engine during that session.

As shown in FIG. 2, the data engine core 150 has a data path 140 which will typically include a number of functional units for executing instructions constituting the tasks being handled by the data engine. The controller 130 within the data engine core 150 is responsible for routing each individual instruction to the appropriate functional unit within the data path 140.

The data engine core 150 communicates with the external environment via the data engine subsystem 100, the external environment being those parts of the data processing apparatus external to the data engine 40, and hence in particular including the memory resources 30, 50. As mentioned earlier, the data engine subsystem is configured by the main processing unit 20 (in one embodiment this occurs on a session-by-session basis) and is arranged to manage communication between the data engine core 150 and the external environment such as the external memory devices 30, 50. In particular, the data engine subsystem 100 includes control logic 110 which is configured by the host processor 20 to allow appropriate communication between the data engine core 150 and the external environment.

In addition to the control logic 110, the data engine subsystem 100 can include one or more resources dedicated to the data engine, an example of such dedicated resources being a portion of memory specifically dedicated to the data engine 40, for example the Tightly Coupled Memory (TCM) 120 shown in FIG. 2.

It should be noted that in some embodiments, more than one data engine may be provided within the data processing apparatus, and in such embodiments each data engine may have its own data engine subsystem, or alternatively a data engine subsystem may be shared between multiple data engine cores.

Figure 3:
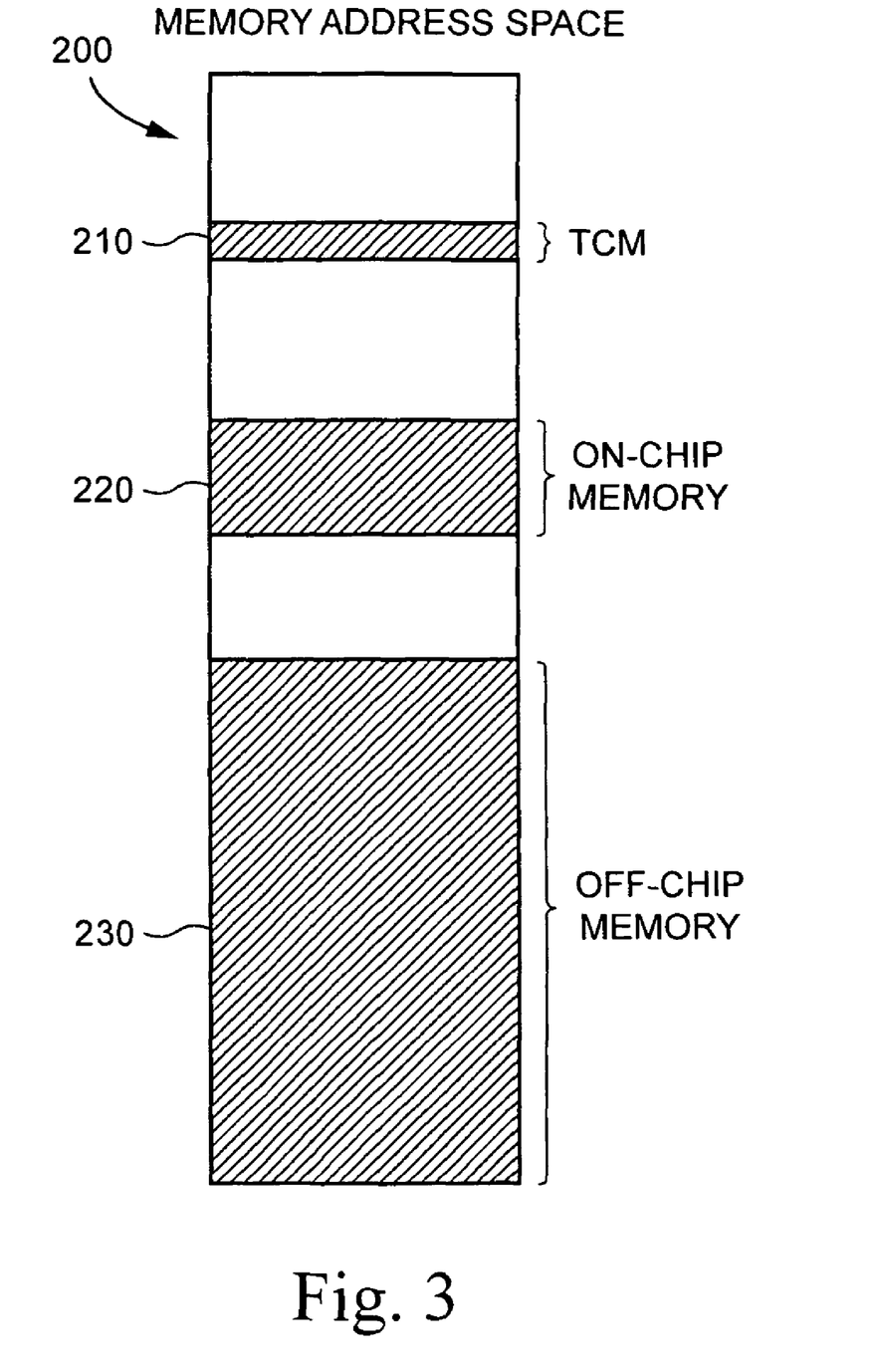
FIG. 3 is a diagram schematically illustrating an example memory address space for the data processing apparatus of FIG. 1.

FIG. 3 is a block diagram showing the entire memory address space 200 of the data processing apparatus of FIG. 1. Each memory device within the data processing apparatus will be allocated a sequence of addresses within the memory address space 200. Hence, by way of example, the off-chip memory 50 of FIG. 1 may be allocated the address range 230, the on-chip memory 30 may be allocated the address range 220, and the TCM 120 may be allocated the address range 210. Any other parts of the memory system of the data processing apparatus will be allocated other available address ranges within the memory address space 200. It should be noted from FIG. 3 that there is no requirement for the memory address ranges for the various memory devices of the apparatus to occupy a single sequential range within the memory address space, and indeed as shown in FIG. 3 gaps may be provided between the end of the address range of one memory device and the start of the address range for another memory device.

When a computer program is compiled for execution on one of the processing units of the data processing apparatus, for example the host processor 20 or the data engine 40, then the compilation process will seek to schedule the sequence of instructions constituting the computer program with the aim of enabling efficient execution of the computer program (for example by aiming to reduce the occurrence of stall conditions where an instruction cannot execute until a preceding instruction has completed), and will also map the instructions to the various sections of memory provided within the data processing apparatus. Each separate memory device 30, 50, 120 will typically be considered as separate section of memory, but it will also be noted that within a single memory device a plurality of different memory sections can be considered to exist if appropriate. In accordance with embodiments of the present invention, an optimisation process is incorporated within the compilation process with the aim of seeking to provide a particularly efficient mapping of the instructions of the computer program to the various memory sections of the memory system.

Each different memory section will have different cost factors associated therewith. For example, a large off-chip SDRAM may be considered from a practical point of view to be virtually unlimited in size, but an access to the memory will have a relatively high power consumption associated therewith, and will incur a relatively high latency, when compared with other sections of memory. Considering a smaller on-chip memory such as an SRAM, then this is likely to be significantly more limited in size, but an access to that memory will have a lower latency and a lower power consumption associated therewith, when compared with an access to the larger off-chip memory. With regard to a memory dedicated to the particular processing unit, for example the TCM 120 dedicated to the data engine 40, this will typically be of small size, but an access to that memory will incur less power consumption, and typically less latency, than accesses to the other memory devices discussed above. However, such memory will typically be relatively costly to provide within the data processing apparatus, due at least in part to the fact that it is dedicated to a particular processing unit of the apparatus, and cannot be shared with other processing units.

In accordance with one embodiment of the present invention, a global static memory record is provided which contains, for each memory section of the memory system, a corresponding record identifying one or more access properties associated with that memory section. Hence, as an example, such access properties might identify the latency of an access, the power consumption associated with an access, the bandwidth available for accessing the associated memory section, the actual cost of that memory, an indication as to whether that memory is shared with other processing units of the data processing apparatus, etc. In accordance with one embodiment of the present invention, this information is then used in the compilation process used to compile a computer program, in order to seek to provide an efficient mapping of the instructions of that program amongst the various available memory sections.

Figure 4:
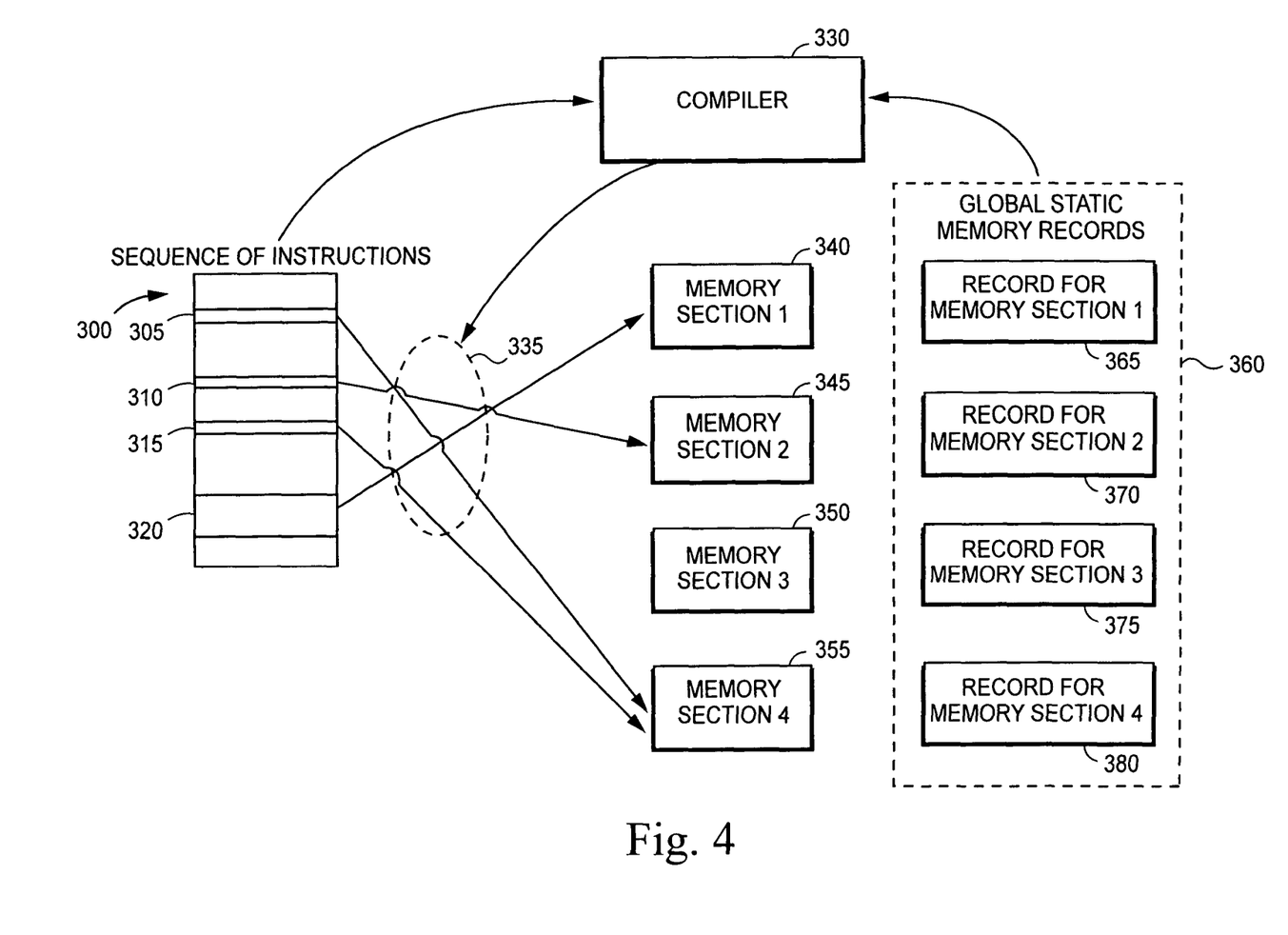
FIG. 4 is a diagram schematically illustrating the compilation process in accordance with one embodiment of the present invention.

This process is illustrated schematically in FIG. 4, where a sequence of instructions 300 constituting a computer program to be executed on the data engine 40 is input to a compiler 330. The job of the compiler 330 is to take the source code of the computer program, and produce corresponding object code which is both scheduled for execution by the data engine, and also mapped to the memory system of the apparatus, the memory system comprising a plurality of separate memory sections 340, 345, 350, 355. The compiler 330 can take a variety of forms, but in one embodiment the compiler is operable to produce from the source code an intermediate representation of the computer program maintaining total information about the computer program being compiled. One example of a suitable compiler is a data flow graph compiler, the data flow graph corresponding to a plurality of linked vertices, a vertex representing a data processing operation performed by the computer program, and a link between vertices representing data flow between data processing operations. One example of such a data flow graph compiler is described in detail in co-pending U.S. application Ser. No. 11/113,307, the entire contents of which are hereby incorporated by reference.

The compiler 330 is given the entire computer program under consideration, and a single function (interface) is defined as the entry-point/stub (main). The compiler 330 will schedule and map the object code on the prescribed memory resources, resulting in a scheduled and resource-mapped code sequence, assuming a non-constrained, flat, memory model. Hence, at this point, no reference is made to the actual costs associated with the particular memory sections, and instead a linear, infinite, unit cost memory is assumed to exist. At this point, tools associated with the compiler will typically return static profiling information of the application given the particular architecture of the apparatus on which the application is to run, thus specifying the access patterns to all data and program memory.

At this point, a code mapping optimisation procedure is invoked. As part of this procedure, a cost function will be produced, that computes a cost value as a function of the proposed mapping of the instructions amongst the memory sections 340, 345, 350, 355, and the associated memory section records 365, 370, 375, 380 of the global static memory records 360. As will be discussed later other factors can be incorporated within the cost function, such as any user-defined bounding information, for example a minimum/maximum size of each of the memory sections associated with their respective memory records. Then, a minimisation procedure is performed with the aim of reducing the cost value computed by the cost function until it reaches at a satisfactory threshold cost value. It will be appreciated by those skilled in the art that there are a number of known driver tools available which can minimise an arbitrary target function, and accordingly any of those driver tools could be used to perform this minimisation procedure, using the cost function as an argument. In one embodiment, the driver tool may incorporate both the minimisation procedure function and the compiler, in which case the driver tool will receive the initial mapping, and at least the cost function and the global static memory records 360, and based on that information will perform an iterative process until some predetermined condition is met, at which point it will output a modified mapping whose associated cost value most closely satisfies the threshold cost value.

In an alternative embodiment, the driver tool may contain the minimisation procedure function, with the compiler being provided externally to the driver tool. In that instance, the driver tool will seek to modify the operating constraints of the compiler in order to seek to reduce the cost value of the cost function, and the compiler will then output a modified mapping based on the modified operating constraints. This process is repeated iteratively until the predetermined condition is met, at which point the mapping whose associated cost value most closely satisfies the threshold cost value is output.

In FIG. 4, the compiler and associated minimisation procedure functions (whether incorporated within a single driver tool, or separately) are indicated by the compiler block 330, and as a result of iterative execution of the optimisation loop this will result in the output of a mapping 335 which aims to achieve the desired threshold cost value for the cost function. FIG. 4 shows some particular code portions 305, 310, 315, 320 of the instruction sequence 300 for illustration purposes, and as can be seen from FIG. 4, this mapping 335 may result in the code portions 305, 315 being mapped to memory section four 355, the code portion 310 being mapped to memory section two 345, and the code portion 320 being mapped to memory section one 340.

Since the controller 130 of the data engine core 150 is capable of referring to program words in a system wide memory map, and to let the program counter jump with arbitrary strides, this allows a very fine relocation of the instructions to take place during the above described compilation procedure, and in particular the object code can be relocated at the instruction level with the aim of achieving the desired cost value. Accordingly, at least one of the code portions 305, 310, 315, 320 may be individual instructions. Alternatively, a code portion may be a particular sequence of instructions which it is appropriate to map collectively in a single memory section, for example a sequence of instructions forming a loop.

Figure 5:
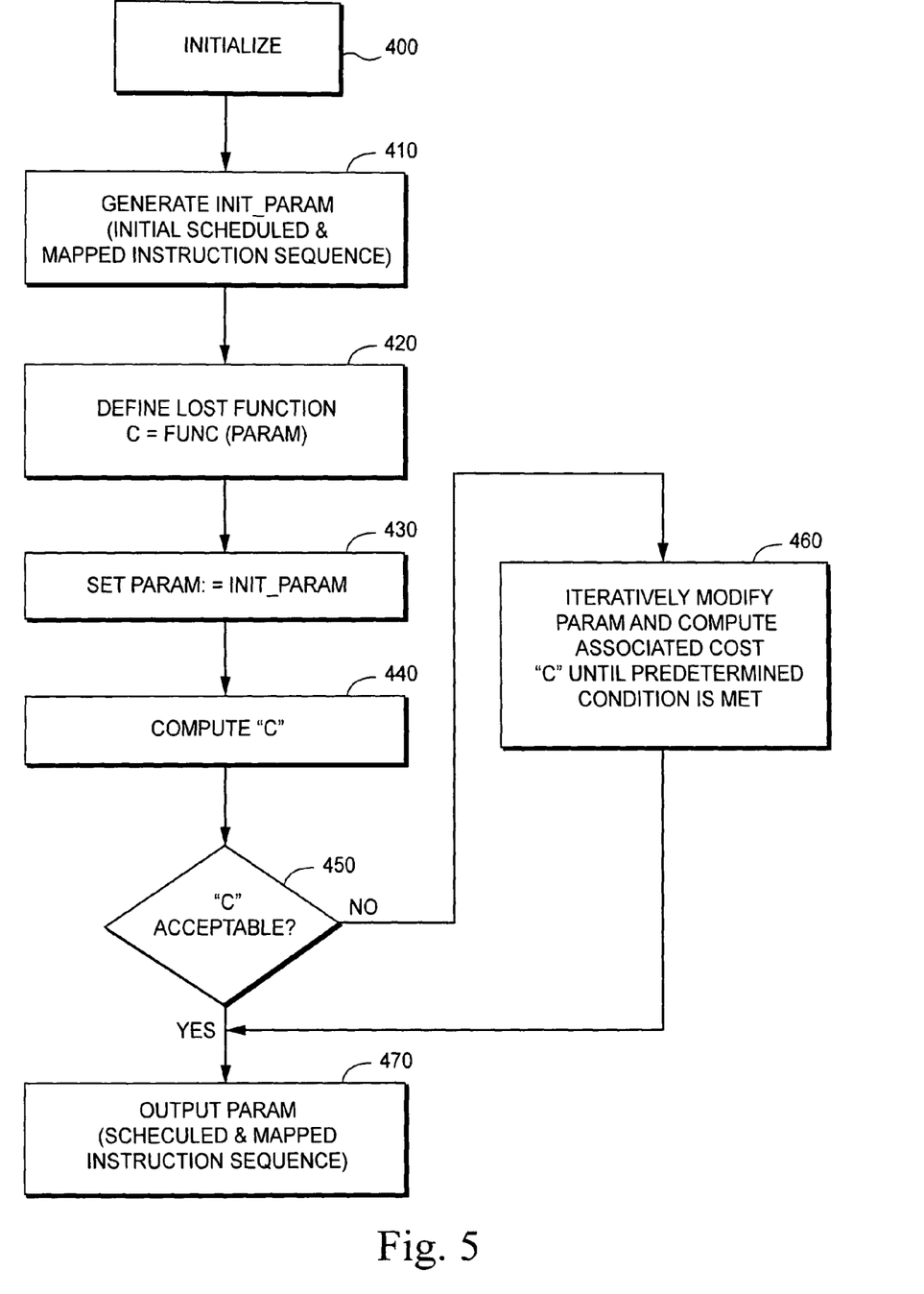
FIG. 5 is a flow diagram illustrating the steps performed when compiling a computer program in accordance with one embodiment of the present invention.

FIG. 5 is a flow diagram illustrating in more detail the steps performed in the above described compilation process in order to seek to optimise the memory mapping performed. At step 400, the process is initialised, whereafter at step 410 an initial scheduled and mapped instruction sequence is generated by the compiler, this being referred to as the "INIT_PARAM". Then, at step 420 a cost function is defined which is a function of the mapped instruction sequence, referred to in FIG. 5 as "PARAM". As discussed earlier, the cost function will also be a function of other factors, most notably the global static memory records 360. However, in the embodiment considered herein, the global static memory records 360 are not altered, and hence are not considered as parameters of the cost function, instead the parameters being considered to be those factors of the cost function which can be modified by the driver tool in order to seek to reduce the cost value computed by the cost function.

At step 430, PARAM is set equal to INIT_PARAM, whereafter at step 440 the cost function is evaluated in order to produce the cost value "C". Then, at step 450, it is determined whether the cost value C computed at step 440 is acceptable, this being determined with reference to a threshold cost value typically defined by the user. If the cost value is acceptable, then the process proceeds directly to step 470, where the current parameters "PARAM" are output as the scheduled and mapped instruction sequence resulting from the compilation process. However, if the cost value is not acceptable, the process branches to step 460, where the above-mentioned optimisation procedure is used to iteratively modify the parameters "PARAM" and to compute the associated cost value until a predetermined condition is met. At that point, the process then proceeds to step 470, where the parameters "PARAM" whose associated cost value most closely satisfy the threshold cost value are output. Hence, this results in the output of a scheduled and mapped instruction sequence whose associated cost value most closely satisfies the threshold cost value.

In addition to the proposed mapping being considered as a parameter of the cost function, other parameters may also be provided for the cost function, one example being any user defined bounding information. In such embodiments, the parameters "PARAM" can hence be considered to be both the proposed scheduled and mapped instruction sequence, and any associated user defined bounding information, which may be modified from that defined by the user if deemed appropriate during the optimisation procedure performed at step 460. Via such user defined bounding information, the user can identify certain desirable constraints as perceived by the user. A typical example is as follows. For the data processing apparatus described earlier, there will be both local TCM 120, on-chip RAM 30 and off-chip RAM 50, and the user may provide associated memory records for each such memory, and specify a user constraint that the TCM usage should not exceed, say, 10 KBytes. It may transpire in such an example that after compilation the compiled program turns out to be larger than expected (say 40 KBytes), with critical sections intended for the TCM 120 being approximately 20 KBytes in size.

In this situation, it is likely that the optimisation process performed at step 460 will be unable to achieve a solution where the cost value meets the desired threshold cost value, due to the fact that 20 KBytes is significantly larger than the 10 KBytes defined by the user for TCM usage. If the tool were unable to modify this user defined constraint, there would be a risk that the output from the procedure at step 470 would be a non-optimal solution, caused by the tool exiting when some predetermined iteration count is reached.

However, in accordance with one embodiment, the driver/optimisation routine performed at step 460 is allowed to loosen such a user defined constraint, if and only if this results in an appropriate decline in the cost value. In the above example, this may for example result in the optimisation routine achieving the desired cost value, but with a TCM usage of 18 KBytes. It should be noted that in some embodiments the user defined constraints can also be ignored if they are unnecessary. For example, if the user had specified a TCM usage that may not exceed 40 KBytes, for the same example described above, the optimiser routine will again produce a solution where the TCM usage required is 18 KBytes, thus indicating that there are large unused portions of the code that can be offloaded to more remote memory at virtually no cost.

Figure 6:
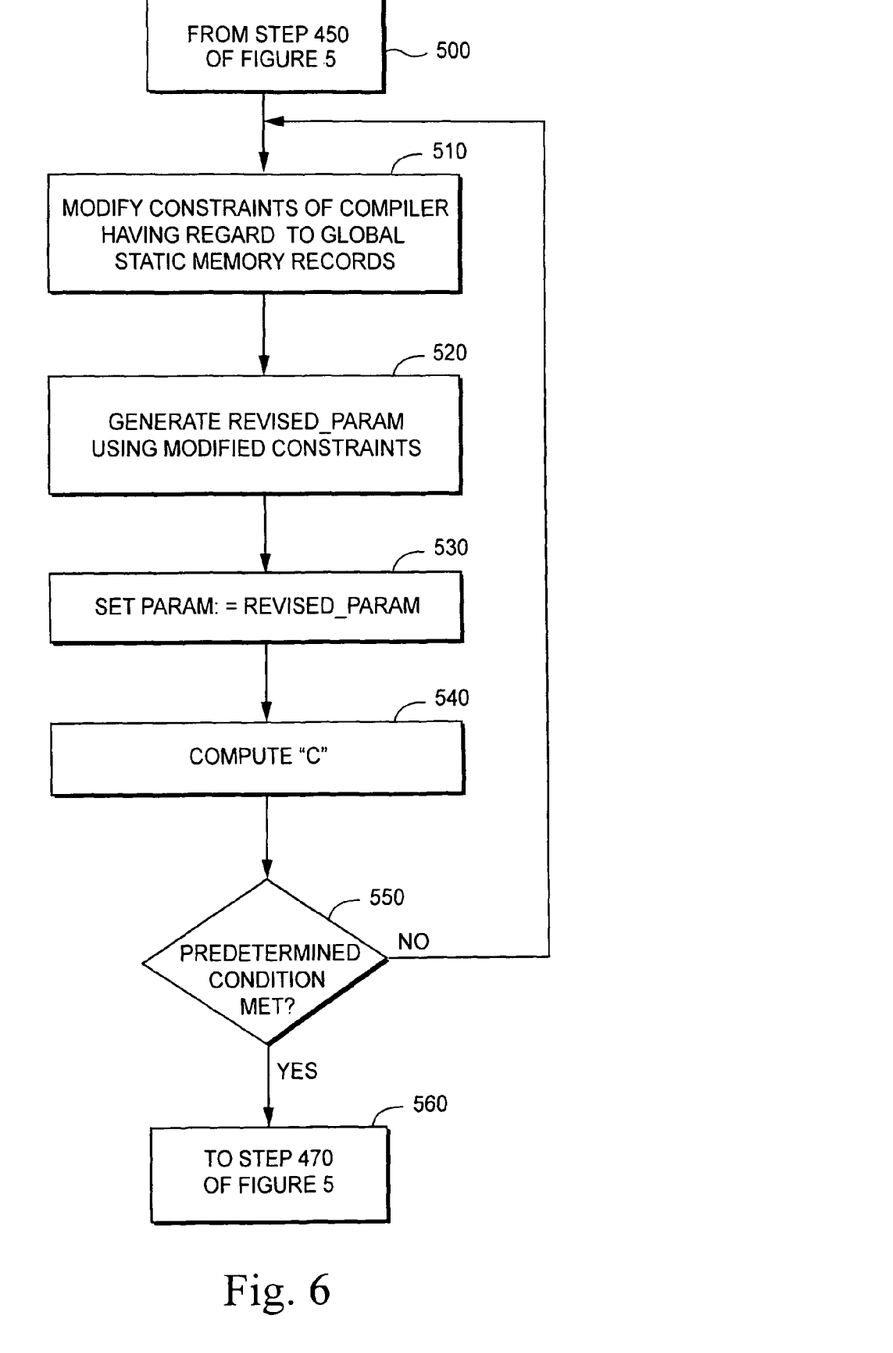
FIG. 6 is a flow diagram illustrating in more detail the steps performed to implement step 460 of FIG. 5 in accordance with one embodiment of the present invention.

FIG. 6 is a flow diagram illustrating in more detail the steps that may be performed in accordance with one embodiment in order to implement the optimisation procedure of step 460 of FIG. 5. In the example of FIG. 6, it is assumed that the driver/optimisation tool is separate to the compiler, and accordingly the tool modifies the constraints under which the compiler operates and the compiler then produces a revised output mapping. Conceptually, the same process can be thought to exist within a single optimisation/compiler driver tool, although the modified constraints need not be produced explicitly.

The process starts at step 500, as a result of a branch from step 450 of FIG. 5. Thereafter, at step 510, the constraints of the compiler are modified having regard to the global static memory records. Then, at step 520, the compiler is arranged to generate a revised mapping, referred to in FIG. 6 as "REVISED_PARAM", using the modified constraints output from step 510. Thereafter, at step 530, PARAM is set equal to REVISED_PARAM, and then at step 540 the cost function is evaluated to produce a revised cost value "C". Next, at step 550, it is determined whether a predetermined condition is met, and if so the process then proceeds to step 470 of FIG. 5 (see step 560 of FIG. 6). However, if the predetermined condition is not met, then the process returns to step 510 to perform another iteration.

Figure 7:
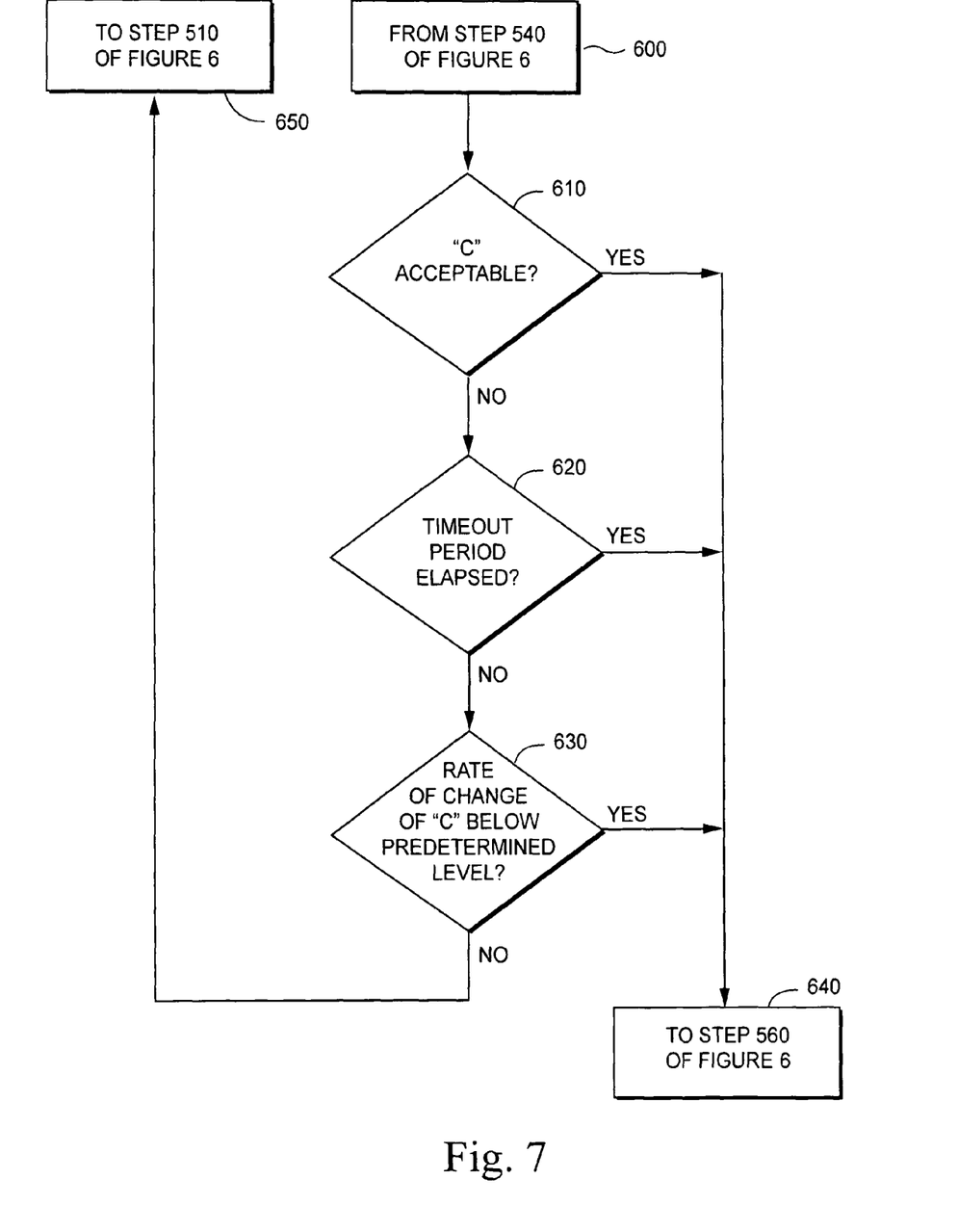
FIG. 7 is a flow diagram illustrating in the more detail the steps performed to implement step 550 of FIG. 6 in accordance with one embodiment of the present invention.

FIG. 7 is a flow diagram illustrating in one embodiment the steps performed at step 550 of FIG. 6 in order to determine whether the predetermined condition is met. At step 600 the process starts as a result of receiving the output from step 540 of FIG. 6. At step 610 it is determined whether the cost value is acceptable, and if so the predetermined condition is considered to have been met and the process proceeds directly to step 560 of FIG. 6 (see step 640). However, if the cost value is not acceptable, it is determined whether the timeout period has elapsed at step 620. In this embodiment, it is assumed that a counter is incremented each time the loop of FIG. 6 is performed, such that if a predetermined number of optimisation iterations have been performed without the cost value reaching the desired cost value, then the predetermined condition is considered to have been met, and the process proceeds directly to step 560 of FIG. 6.

If the timeout has not elapsed, then the process proceeds to step 630, where it is determined whether the rate of change of the cost value is below a predetermined level. In one embodiment, if the rate of change of the cost value falls below a predetermined level, it is assumed that performing subsequent iterations is unlikely to result in the desired cost value being achieved, and instead at this point the predetermined condition is determined to have been met, and the process proceeds directly to step 560 of FIG. 6. It should be noted that if step 560 of FIG. 6 is reached via either steps 620 or 630, then the PARAM value output at step 470 of FIG. 5 will represent a scheduled and mapped instruction sequence whose associated cost value has not satisfied the threshold cost value, but whose associated cost value has come closest to satisfying that threshold cost value considering the results of all of the iterations performed at step 460, and indeed the INIT_PARAM version produced at step 410.

If at step 630 it is determined that the rate of change is not below the predetermined level, then the process returns to step 510 of FIG. 6 (see step 650) to cause another iteration of the optimisation procedure to be performed.

In one embodiment of the present invention, the data engine subsystem 100 of the data engine 40 may include storage elements that amortise the cost related parameters identified in the records of the individual memory sections. For example, if the data engine subsystem 100 includes a buffer as part of an SDRAM interface to external SDRAM, this can reduce the average latency of the SDRAM as viewed from the data engine core's 150 perspective. In accordance with one embodiment, the global static memory records 360 are hence supplemented with a sub-system record identifying one or more aspects of the data engine subsystem that may alter the data engine core's perception of at least one access property associated with at least one of the memory sections in the global static memory records 360. This information can be taken into account when evaluating the cost function, and hence when generating modified mappings.

In another embodiment, the compiler may be informed that the data engine supports software controlled paging, and the compilation/optimisation decisions can be made taking this into account.

In the example of FIG. 6, it is arranged that when the predetermined condition is not met, the process proceeds directly back to step 510, to cause the constraints of the compiler to be modified. However, in a variant of such an embodiment, the cost value computed at step 540 can be analysed to see if it exists within a chosen range of cost values, such cost values in the range not meeting the threshold cost value. If the lower bound of the range is denoted as C1, C1 being the cost value adjacent the desired threshold cost value, and the other end of the range is defined as C2, then it can be seen that if the computed cost value at step 540 is less than C1, then the predetermined condition will be considered to be met, and the process can proceed directly to step 470 of FIG. 5. However, if the cost value is between values C1 and C2, then in accordance with this alternative embodiment, the process can be arranged to loop back directly to step 520 rather than step 510 (assuming of course that the conditions of steps 620 and 630 are not met) such that another revised PARAM value is produced without further modifying the constraints. This can avoid the constraints being modified unnecessarily, since it is possible that if the cost value is within the range between C1 and C2, then the current constraints may be sufficient in a further iteration to produce a cost value which achieves the desired target. In such embodiments, only if the cost value exceeds C2, does the process return to step 510 to cause the constraints to be modified.

In accordance with one embodiment of the present invention, when the compilation process causes individual code portions to be relocated as described above, jump instructions are automatically inserted into the program sequence to maintain the original sequence of program instructions. As discussed earlier, the controller 130 is capable of referring to program words in a system wide memory map, and allows the program counter to jump with arbitrary strides, as defined by these jump instructions. In such embodiments it can be seen that each independently mapped code portion has a cost associated therewith resulting from the addition of a jump instruction to enable the data engine executing the code to locate that code portion. However this cost can be generalised as simply a cost in program size, and thus translated into a secondary cost in terms of power consumption, memory area, access latency, etc. As a result this cost can be taken into account within the cost function evaluated during the compilation process, and hence the technique of embodiments of the present invention can balance the trade-off between this cost penalty associated with relocating code portions and the potential mapping gains to be achieved by such relocation.

In embodiments where the compiler takes the form of the data flow graph compiler described in co-pending U.S. application Ser. No. 11/113,307, that data flow graph compiler is arranged to associate linked vertices within the data flow graph to form clusters of linked vertices corresponding to data processing operations to be scheduled together for execution. In accordance with one embodiment, the optimisation routine at step 460 of FIG. 5 is arranged to modify the code clustering parameters during each iteration.

From the above described embodiment, it will be appreciated that a number of advantages result from the use of such a technique. Firstly, no a-priori code partitioning is required, and instead the analysis by the compiler covers the entire application. Further, no re-partitioning is required after the compilation process has been performed, since the program code to memory address mapping performed as part of the compilation process does not depend on the function/procedure boundaries. This should be contrasted with a linker-based platform approach to partitioning code, which is limited in distributing its code portions as a sum of linked objects (may form a DLL or static library).

In addition, no cache or cache predictor is required and no ad-hoc reactive behaviour needs to be implemented, given that the mapping is known to the compiler. When the data engine subsystem includes elements such as buffers and the like which can hide some of the latencies of external memory to the data engine core, then these factors can be taken into account in the analysis performed by the compiler, and an optimum mapping for this situation can be determined. The use of embodiments of the present invention can also bring about a reduction in cache throughput requirements, which is specifically beneficial for data engines of the type described earlier with reference to FIG. 2, which have a higher than general program data throughput per cycle than other known processing unit architectures.

Finally, the process is very efficient, because it is necessary for the program code to be compiled for a specific data engine architecture anyway, and the process of embodiments of the present invention provides an optimised code mapping as part of this process.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A method of compiling a computer program for execution on a data processing apparatus having memory configured into a plurality of memory sections, each memory section having a record of attributes associated therewith identifying one or more access properties associated with that memory section, said access properties comprising at least one of latency of an access, energy cost of an access, an available access bandwidth to the associated memory section, energy cost of storing a data unit in the associated memory section and an indication as to whether access to the associated memory section is contended due to sharing with other data processing apparatuses, the method comprising the steps of:
   a) performing a compilation in order to generate a plurality of code portions each with an initial mapping in the memory;
   b) evaluating a cost function to generate a cost value associated with the initial mapping of the plurality of code portions, said cost function dependent on said record of attributes of at least one of said plurality of memory sections;
   c) if the cost value does not satisfy a threshold cost value, re-performing the compilation of the program into a plurality of code portions having regard to the record of attributes of each memory section in order to generate a modified mapping;
   d) re-evaluating the cost function to generate a revised cost value associated with the modified mapping by accounting an access cost based on said attributes;
   e) iteratively repeating steps (c) and (d) until a predetermined condition is met; and
   f) outputting the mapping whose associated cost value most closely satisfied the threshold cost value, wherein the compilation at steps (a) and (c) is performed by a compiler having a set of operating constraints.

2. A method as claimed in claim 1, wherein said step (c) comprising the steps of:

modifying the set of operating constraints governing the compilation process having regard to the record of each memory section; and
re-performing the compilation in the compiler based on the modified set of operating constraints in order to generate the modified mapping.

3. A method as claimed in claim 1, further comprising the step of:
providing at least one user defined constraint identifying a desired limitation to be taken into account when mapping each code portion of the program in the memory.

4. A method as claimed in claim 3, further comprising the steps of:
if during said step (e) a lack of convergence of the cost value with the threshold cost value is detected, then modifying the user defined constraint when generating the modified mapping at said step (c).

5. A method as claimed in claim 4, wherein said lack of convergence is detected if at least one of the following conditions is detected:
the decrease of the cost value exceeds a predetermined maximum rate of decay;
the decrease of the cost value is lower than a predetermined minimum rate of decay;
the cost value increases.

6. A method as claimed in claim 1, wherein the computer program is for execution on a data engine operable to perform tasks on behalf of a main processing unit of the data processing apparatus.

7. A method as claimed in claim 6, wherein said data engine comprises a data engine core operable to execute the computer program and a data engine subsystem operable to manage access to said memory sections by the data engine core, and at said step (c) the re-performing of the compilation further has regard to a subsystem record identifying one or more aspects of the data engine subsystem that alters the data engine core's perception of at least one access property associated with at least one of said memory sections.

8. A method as claimed in claim 1, wherein the predetermined condition is met if at least one of the following events occurs:
the revised cost value satisfies the threshold cost value;
a predetermined period of time has elapsed without the revised cost value satisfying the threshold cost value;
the rate of change of the cost value drops below a predetermined level.

9. A method as claimed in claim 1, wherein at least one code portion is an individual instruction.

10. A method as claimed in claim 1, wherein the re-evaluation of the cost function at said step (d) comprises the steps of:
deriving from the modified mapping access information comprising at least one of the frequency of access to each memory section and access patterns of the program being compiled; and
using the access properties identified in the record of each memory section and the access information to evaluate the cost function.

11. A method as claimed in claim 10, wherein when evaluating the cost function one or more of the following factors associated with a memory access is derived from the access properties identified in the associated record:
power consumption associated with the memory that is the subject of the memory access;
latency of the memory that is the subject of the memory access;

bandwidth associated with the memory that is the subject of the memory access;
cost of the memory that is the subject of the memory access;
potential impact on other elements of the data processing apparatus with which the memory that is the subject of the memory access is shared.

12. A method as claimed in claim 1, wherein the compilation at said steps (a) and (c) is performed by a compiler, the compiler receiving source code of the computer program and producing corresponding object code, and being operable to produce from the source code an intermediate representation of the computer program maintaining total information about the computer program being compiled.

13. A computer program product comprising a computer program carrier bearing a computer program operable to control a computer to perform a method as claimed in claim 1.

14. A system for compiling a computer program for execution on a data processing apparatus having memory configured into a plurality of memory sections, each memory section having a record of attributes associated therewith identifying one or more access properties associated with that memory section, said access properties comprising at least one of a size of said associated memory section, latency of an access, energy cost of an access, an available access bandwidth to the associated memory section, energy cost of storing a data unit in the associated memory section and an indication as to whether access to the associated memory section is contended due to sharing with other data processing apparatuses, the system comprising:
compiler logic configured to perform a compilation in order to generate a plurality of code portions each with an initial mapping of the program in the memory;
cost function logic configured to evaluate a cost function to generate a cost value associated with the initial mapping of the plurality of code portions, said cost function being dependent on said record of attributes of at least one of said plurality of memory sections;
the compiler logic, if the cost value does not satisfy a threshold cost value, configured to re-perform the compilation of the program into a plurality of code portions having regard to the record of attributes of each memory section in order to generate a modified mapping;
the cost function logic configured to re-evaluate the cost function to generate a revised cost value associated with the modified mapping by accounting an access cost based on said attributes;
the compiler logic and cost function logic configured to iteratively repeat the generating of the modified mapping, the re-performing of the compilation and the re-evaluating of the cost function until a predetermined condition is met;
wherein once the predetermined condition is met the mapping whose associated cost value most closely satisfied the threshold cost value is output, wherein said compiler logic uses a set of operating constraints when generating the modified mapping and re-performing said compilation.

15. A method as claimed in claim 4, wherein said lack of convergence is detected if the cost value increases.

16. A method of compiling a computer program for execution on a data processing apparatus having memory configured into a plurality of memory sections, each memory section having a record of attributes associated therewith identifying one or more access properties associated with that memory section, said access properties comprising at least one of a size of the associated memory section, latency of an access, energy cost of an access, an available access bandwidth to the associated memory section, energy cost of storing a data unit in the associated memory section and an indication as to whether access to the associated memory section is contended due to sharing with other data processing apparatuses, the method comprising the steps of:
a) performing a compilation in order to generate a plurality of code portions each with an initial mapping in the memory;
b) evaluating a cost function to generate a cost value associated with the initial mapping of the plurality of code portions, said cost function being dependent on said record of attributes of at least one of said plurality of memory sections;
c) if the cost value does not satisfy a threshold cost value, re-performing the compilation of the program into a plurality of code portions having regard to the record of attributes of each memory section in order to generate a modified mapping;
d) re-evaluating the cost function to generate a revised cost value associated with the modified mapping by accounting an access cost based on said attributes;
e) iteratively repeating steps (c) and (d) until a predetermined condition is met; and
f) outputting the mapping whose associated cost value most closely satisfied the threshold cost value;
wherein at least said steps (b) to (d) are performed by a driver tool which receives at least the cost function and the record of each memory section as inputs and produces the modified mapping as an output.

17. A system for compiling a computer program for execution on a data processing apparatus having memory configured into a plurality of memory sections, each memory section having a record of attributes associated therewith identifying one or more access properties associated with that memory section, said access properties comprising at least one of a size of said associated memory section, latency of an access, energy cost of an access, an available access bandwidth to the associated memory section, energy cost of storing a data unit in the associated memory section and an indication as to whether access to the associated memory section is contended due to sharing with other data processing apparatuses, the system comprising:
compiler logic configured to perform a compilation in order to generate a plurality of code portions each with an initial mapping of the program in the memory;
a driver tool configured to evaluate a cost function to generate a cost value associated with the initial mapping of the plurality of code portions, said cost function being dependent on said record of attributes of at least one of said plurality of memory sections;
said driver tool, if the cost value does not satisfy a threshold cost value, configured to re-perform the compilation of the program into a plurality of code portions having regard to the record of attributes of each memory section in order to generate a modified mapping;
said driver tool configured to re-evaluate the cost function to generate a revised cost value associated with the modified mapping by accounting an access cost identified by said attributes;
said driver tool and cost function logic configured to iteratively repeat the generating of the modified mapping, re-performing of the compilation and the re-evaluating of the cost function until a predetermined condition is met;

wherein once the predetermined condition is met the mapping whose associated cost value most closely satisfied the threshold cost value is output; and wherein said driver tool receives at least the cost function and the record of each memory section as inputs and produces the modified mapping as an output.

18. A method of compiling a computer program for execution on a data processing apparatus having memory configured into a plurality of memory sections, each memory section having a record of attributes associated therewith identifying one or more access properties associated with that memory section, said access properties comprising at least one of a size of the associated memory section, latency of an access, energy cost of an access, an available access bandwidth to the associated memory section, energy cost of storing a data unit in the associated memory section and an indication as to whether access to the associated memory section is contended due to sharing with other data processing apparatuses, the method comprising the steps of:

a) performing a compilation in order to generate a plurality of code portions each with an initial mapping in the memory;

b) evaluating a cost function to generate a cost value associated with the initial mapping of the plurality of code portions, said cost function being dependent on said record of attributes of at least one of said plurality of memory sections;

c) if the cost value does not satisfy a threshold cost value, re-performing the compilation of the program into a plurality of code portions having regard to the record of attributes of each memory section in order to generate a modified mapping;

d) re-evaluating the cost function to generate a revised cost value associated with the modified mapping by accounting an access cost based on said attributes;

e) iteratively repeating steps (c) and (d) until a predetermined condition is met; and f) outputting the mapping whose associated cost value most closely satisfied the threshold cost value, wherein when evaluating the cost function at least one of the following factors associated with a memory access is derived from the access properties identified in the associated record:

power consumption associated with the memory that is the subject of the memory access;

latency of the memory that is the subject of the memory access;

bandwidth associated with the memory that is the subject of the memory access;

cost of the memory that is the subject of the memory access; and potential impact on other elements of the data processing apparatus with which the memory that is the subject of the memory access is shared.

19. A system for compiling a computer program for execution on a data processing apparatus having memory configured into a plurality of memory sections, each memory section having a record of attributes associated therewith identifying one or more access properties associated with that memory section, said access properties comprising at least one of a size of said associated memory section, latency of an access, energy cost of an access, an available access bandwidth to the associated memory section, energy cost of storing a data unit in the associated memory section and an indication as to whether access to the associated memory section is contended due to sharing with other data processing apparatuses, the system comprising:

compiler logic configured to perform a compilation in order to generate a plurality of code portions each with an initial mapping of the program in the memory;

cost function logic configured to evaluate a cost function to generate a cost value associated with the initial mapping of the plurality of code portions, said cost function being dependent on said record of attributes of at least one of said plurality of memory sections;

the compiler logic, if the cost value does not satisfy a threshold cost value, configured to re-perform the compilation of the program into a plurality of code portions having regard to the record of attributes of each memory section in order to generate a modified mapping;

the cost function logic configured to re-evaluate the cost function to generate a revised cost value associated with the modified mapping by accounting an access cost based on said attributes;

the compiler logic and cost function logic are configured to iteratively repeat the generating of the modified mapping, re-performing of the compilation and the re-evaluating of the cost function until a predetermined condition is met, wherein once the predetermined condition is met the mapping whose associated cost value most closely satisfied the threshold cost value is output; and when evaluating the cost function, at least one of the following factors associated with a memory access is derived from the access properties identified in the associated record:

power consumption associated with the memory that is the subject of the memory access;

latency of the memory that is the subject of the memory access;

bandwidth associated with the memory that is the subject of the memory access;

cost of the memory that is the subject of the memory access; and potential impact on other elements of the data processing apparatus with which the memory that is the subject of the memory access is shared.

* * * * *